United States Patent [19]

Snyder

[11] 4,384,482
[45] May 24, 1983

[54] VIBRATING TRANSDUCER POWER SUPPLY FOR USE IN ABNORMAL TIRE CONDITION WARNING SYSTEMS

[75] Inventor: Daniel S. Snyder, Norwalk, Ohio

[73] Assignee: Imperial Clevite Inc., Rolling Meadows, Ill.

[21] Appl. No.: 311,354

[22] Filed: Sep. 11, 1981

Related U.S. Application Data

[63] Continuation of Ser. No. 97,646, Nov. 27, 1979, abandoned.

[51] Int. Cl.$^3$ .............................................. B60C 23/02
[52] U.S. Cl. ...................................... 73/146.5; 340/58
[58] Field of Search ............................. 73/146, 146.5; 340/52 R, 58

[56] References Cited

U.S. PATENT DOCUMENTS

| | | | |
|---|---|---|---|
| 3,113,223 | 12/1963 | Smith et al. | 310/329 |
| 3,456,134 | 7/1969 | Ko | 310/329 |
| 3,786,413 | 1/1974 | Matthews et al. | 340/58 |
| 3,852,717 | 12/1974 | Hosaka et al. | 73/146.5 |
| 4,075,603 | 2/1978 | Snyder et al. | 340/58 |
| 4,117,452 | 9/1978 | Snyder et al. | 340/58 |
| 4,160,234 | 7/1979 | Karbo et al. | 340/58 |

FOREIGN PATENT DOCUMENTS

| | | |
|---|---|---|
| 1239381 | 7/1971 | United Kingdom . |
| 1276196 | 6/1972 | United Kingdom . |
| 1387523 | 3/1975 | United Kingdom . |
| 1462359 | 1/1977 | United Kingdom . |

OTHER PUBLICATIONS

Gulton Products Division, application note, Piezoceramic Bender Elements—©1978.
Gulton Products Division, Product Specification, Piezoceramic Bender Elements—©1978.

Primary Examiner—James J. Gill
Attorney, Agent, or Firm—Russell E. Baumann

[57] ABSTRACT

An abnormal tire condition warning system is disclosed for use in pneumatic tires. The self-contained device comprises a sensor, an electronic transmitter and a power supply. The power supply is a weighted, vibrating arm that has a piezoelectric transducer attached. Normal wheel vibrations cause the weighted arm to vibrate and flex, in turn causing the transducer to flex, thus producing electrical energy.

6 Claims, 6 Drawing Figures

VIBRATING TRANSDUCER POWER SUPPLY FOR USE IN ABNORMAL TIRE CONDITION WARNING SYSTEMS

This is a continuation of application Ser. No. 097,646, filed Nov. 27, 1979, now abandoned.

BACKGROUND OF THE INVENTION

The present invention relates to abnormal tire condition warning systems and is more particularly directed to a vibrating transducer power supply for use therewith. However, it should be appreciated by those skilled in the art that the invention has far broader applications.

Both over and under inflated conditions for pneumatic tires is a cause for excessive tire wear resulting in premature tire failure. Moreover, such under and over inflated tire conditions can have an adverse effect on the efficiency of operation of the vehicle as to both vehicle performance or handling as well as vehicle gas mileage. Since such conditions and results have been well known for quite some time, there have been many attempts to develop and provide means for automatically detecting and reporting them. Recently, development efforts for a practical and inexpensive device have become more concentrated due to the rise in fuel and tire costs as well as vehicle operations costs in general.

While there have been quite a number of prior devices developed and utilized for detecting tire inflation conditions, all of these prior devices have had structural or operational shortcomings rendering them undesirable or impractical for widespread use. While the specific prior devices have been many and varied, most have required special wiring and the like extending from the wheel assemblies to the vehicle chassis and then through the vehicle body to the instrument panel. Such wiring adds undesired cost to the system and moreover, is extremely difficult and time consuming to install. Such installation time is particularly important when considered on the basis of installing the devices during original vehicle assembly for making them a part of the original vehicle equipment. Further, the necessary special wiring and associated equipment extending between the wheels and chassis are such that they are susceptible to damage or breakage from road materials, weathering and the like encountered during normal vehicle use.

There have also been some of the prior attempts at developing a self-contained detector apparatus in an effort to eliminate the necessity for wiring and the like between the wheels and chassis, but these prior attempts still have not proved totally successful and effective. Specifically, these prior self-contained units have utilized small signal emitters such as a radio transmitter disposed at each wheel. These emitters transmit a signal such as a radio signal in response to some predetermined inflation condition detected in the tire by a sensing means. The signal is then received in the vehicle and utilized to energize a warning indicator or light to advise the vehicle operator that an over or under inflated tire condition is present.

While generally overcoming the wiring problems, the means employed for powering the emitters has thus far proved to be unacceptable for practical widespread vehicle application. Typically, these power means have comprised small batteries associated with each wheel or other, rather exotic and complex circuitry. Batteries must, of course, be periodically replaced as their useful life expires and it is impossible to precisely determine the extent of this useful life as it will vary between individual batteries and between individual manufacturers thereof. Moreover, it has been generally found that many owners are extremely lax with regard to periodic vehicle maintenance. As a result, owners would also simply forget or not take the time to properly check, maintain and replace these small batteries. Therefore, this type of self-contained detector would often be inoperative and, therefore, of no practical value or use. The other, rather exotic and complex circuitry had the disadvantage of being costly and subject to damage of destruction during normal vehicle use.

Still another disadvantage with prior abnormal tire detecting and reporting devices or systems was that their effectiveness depended to a great degree on the rotational speed of the wheel itself. This fact was due to their very design and construction such that the devices were really only effective at elevated vehicle speeds and did not properly operate at normal city driving speeds. Moreover, many of the prior devices were only uni-directional and thus were only operative in one direction of rotation. Accordingly, such devices were limited to mounting on one side or the other of a vehicle.

Still another problem with the prior devices of this general type has been in the necessity for providing operative communication between stationary and rotating components. Because the devices are generally electrically operated, prior devices found it necessary to include slip ring structures to operably interconnect the various components and such structures were found to be susceptible to damage or the like necessitating repair and/or replacement.

OBJECTS OF THE INVENTION

An object of the present invention is to provide a new device for indicating the condition of a pneumatic tire.

Another object of the present invention is to provide a device that indicates the condition of a pneumatic tire and is simple in design, construction and installation.

Another object of the present invention is to provide a fully self-contained device for indicating a condition of a pneumatic tire.

Still another object of the present invention is to provide a power supply that can be used in any system that has natural inherent vibrations.

BRIEF SUMMARY OF THE INVENTION

In accordance with the present invention, there is provided a self-contained device for indicating some predetermined condition of a pneumatic tire of the type used on an automobile. The device includes a power supply which is comprised of a housing attached to the tire rim, an arm that is attached at one end to the housing, a weight attached to the other end of the arm, and a transducer attached to the arm such that normal wheel vibrations will cause the arm to vibrate thus flexing the transducer, thereby producing electrical energy. This power supply energizes the remainder of the device such that the device can send an electronic signal to a monitoring device within the automobile.

In accordance with another aspect of the present invention an electronic circuit which is powered from the above-mentioned power supply is provided for electronic processing of the abnormal condition signal from the sensor.

In still another aspect of the present invention, an antenna is provided for transmitting the electronic signal indicative of the abnormal signal to a monitoring device.

BRIEF DESCRIPTION OF THE DRAWINGS

The invention may take physical form in certain parts and arrangements of parts, an embodiment of which will be described in detail in the specification and illustrated in the accompanying drawings which form a part hereof and wherein.

DESCRIPTION OF THE PREFERRED EMBODIMENTS

Figure 2:
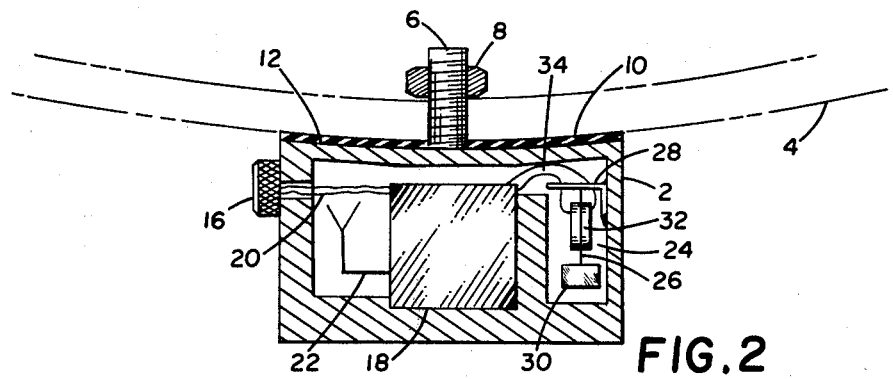
FIG. 2 is an enlarged side elevational view in partial cross-section of the device shown in FIG. 1.

A description of the invention follows, referring to the Figures in which like reference numerals denote like elements of structure in each of the several Figures.

Figure 1:
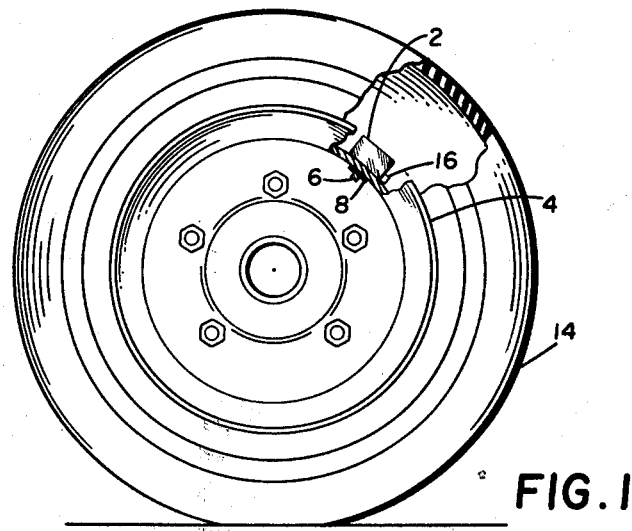
FIG. 1 is a side elevational view in partial cross-section of a vehicle wheel assembly having the device of the present invention installed thereon.
Figure 4:
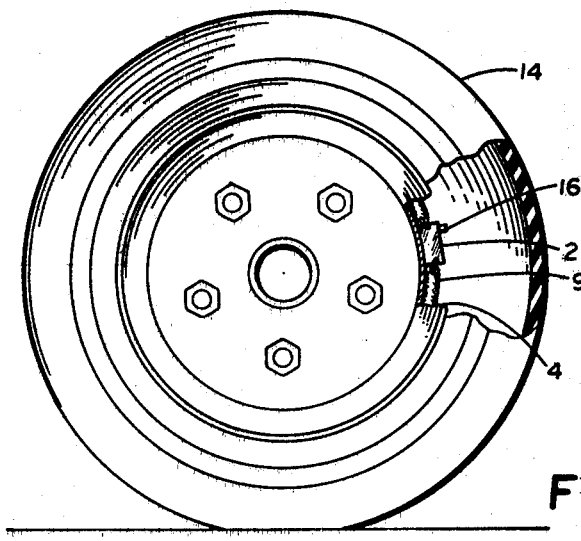
FIG. 4 is a side elevational view in partial cross-section of a vehicle wheel assembly having the device of the present invention installed in yet another configuration.

Referring now to the drawings, there is shown in FIGS. 1 and 2 a housing 2, mounted on the inside of a wheel rim 4, by an attachment means such as bolt 6, and nut 8. The bolt 6 can be an integral part of housing 2, such that the tightening of nut 8 secures the housing 2 to rim 4. A rubber pad 10 is provided in order to form an airtight seal between the housing 2 and rim 4. Also, the surface 12 of housing 2 is preferably curved and contoured to match that of rim 4. This aids in forming an airtight seal between the housing 2 and rim 4. It will be apparent to those skilled in the art that there are other methods of attaching housing 2 to wheel rim 4 such as shown in FIG. 4 wherein housing 2 is fixedly attached by means of a band 9. Band 9 may take the form of an adjustable type construction described in co-pending U.S. application Ser. No. 822,478, filed on Mar. 1, 1978 by Thomas G. Susko and assigned to the same assignee of the present application. In both FIGS. 1 and 4 housing 2 is fixedly mounted on the rim 4 such that the housing 2 is within the cavity of the pneumatic tire 14.

A sensor 16 is provided to sense an abnormal condition within tire 14. The sensor 16 is mounted on the outside of housing 2 such that a condition within tire 14 can be detected. An electronic circuit 18, located within housing 2, is electrically connected to the sensor 16 by wires 20. The electronic circuit 18 processes the signal from the sensor 16 and then transmits a signal indicative of the sensed condition by way of antenna 22 to a monitoring device, not shown. Electronic circuit 18 is preferably of the type described in co-pending U.S. application Ser. No. 034,900, filed Apr. 30, 1979 by David Betts and assigned to the same assignee of the present invention and is incorporated by reference herein. It is contemplated that the sensor 16 will shunt out the voltage generated by the vibrating transducer system 24 when the condition is within acceptable limits. When the condition falls outside of the acceptable limits, the voltage generated by system 24 will pass to electronic circuit 18. The voltage passed will be used to charge a capacitor. When the capacitor charge reaches a specific level, a counter will begin counting the transducer pulses. When the counter reaches a predetermined count, a signal will then be transmitted to a monitoring device. The monitoring device is a receiver located within the interior of the vehicle and can be equipped with a warning light, a warning buzzer or an analog indicator. The antenna 22 will preferably take the form of a wire that can be molded into the housing itself for added durability or can be mounted on the electronic circuit board, not shown. Referring to FIG. 2, the electric energy to power the electronic circuit 18 is generated by the vibrating transducer system 24. The vibrating transducer system 24 comprises an arm 26, fixedly attached at one end to housing 2 by bracket 28, a weight 30 attached to arm 26 at the free end and transducer 32 is fixedly attached to arm 26. In normal operation of the vehicle, the tire is subject to natural vibrations such as wheel hop and the like as well as road conditions. Wheel hop is an inherent oscillation that occurs in all motor vehicles. Since a wheel system is designed to try and smooth the vehicle ride by use of springs and shock absorbers, the wheel has a tendency to hop even on smooth roads. It has been found that a wheel hop of approximately 10 HZ occurs in a typical passenger vehicle. These vibrations will cause the arm to vibrate, thus causing the transducer 32 to flex. Transducer 32 will preferably be a piezoelectric element. This type of transducer is well known in the art. A piezoelectric transducer converts mechanical energy into electrical energy. The type of piezoelectric contemplated by the present invention would preferably be a double layer piezoelectric that is polarized in opposite directions and electrically connected in series. The voltage generated by the piezoelectric element will then be the sum of the individual layer outputs. It is this generated voltage that is used to power electronic circuit 18. The energy produced from vibrating transducer system 24 is passed to electronic circuit 18 via wires 34.

As will be appreciated by those skilled in the art, the electronic circuit 18 can process the condition signal from sensor 16 in many different ways. For example, the electronic circuit 18 may transmit a signal only when the condition in the cavity exceeds some predetermined level. By way of another example, the circuit 18 may transmit a continuous signal indicative of the cavity condition. The type of signal transmitted may also be quite varied. For example, the electronic circuit 18 may transmit a coded, digital signal or it may transmit a basic FM or AM signal. Different methods of transmitting an abnormal condition signal are described in co-pending U.S. applications Ser. No. 034,899 by D. Betts, R. Sobecks and R. Green, filed Apr. 30, 1979 and Ser. No. 034,900 by D. Betts, filed Apr. 30, 1979, both assigned to the assignee of the present invention and are incorporated by reference herein.

Figure 3:
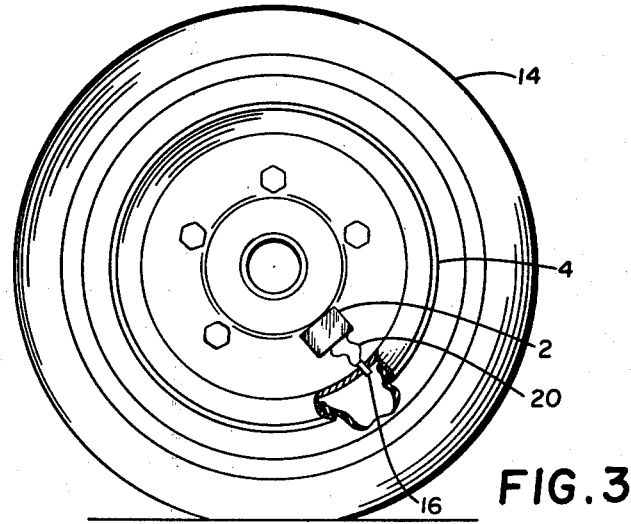
FIG. 3 is a side elevational view in partial cross-section of a vehicle wheel assembly having the device of the present invention installed in another configuration.

FIG. 3 shows another embodiment of the present invention in which housing 2 is mounted externally to the cavity of tire 14. The sensor 16 is then mounted such that it can sense the cavity condition.

Figure 5:
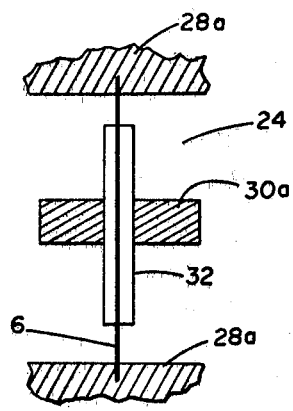
FIG. 5 is an enlarged side elevational view in partial cross-section of the vibrating transducer system in another configuration.
Figure 6:
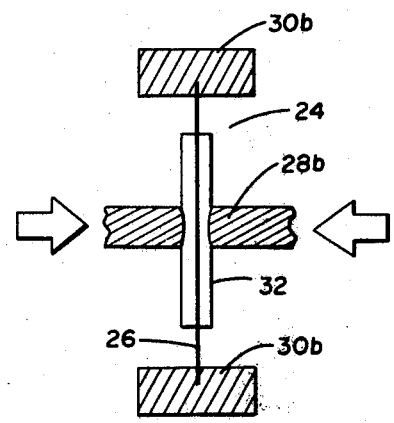
FIG. 6 is an enlarged side elevational view in partial cross-section of the vibrating transducer system in yet another configuration.

FIGS. 5 and 6 show two alternative methods of mounting the vibrating transducer system 24. Referring to FIG. 5, arm 26 is fixedly attached at both ends by rigid support 28a. The piezoelectric 32 is attached to arm 26 between the supports 28a. The weight 30a is attached to piezoelectric 32 at approximately half way between supports 28a such that wheel vibrations will cause the arm 26 to vibrate, thus causing the piezoelectric 32 to flex. Referring to FIG. 6, piezoelectric 32 is attached to arm 26. Piezoelectric 32 is then mounted in rigid support member 28b such that the piezoelectric 32 and arm 26 protrude outwardly therefrom. Weights 30b are then fixedly attached to the ends of arm 26 such that wheel vibrations will cause arm 26 to vibrate, thus causing the piezoelectric 32 to flex. It will be apparent to those skilled in the art that there are other methods of mounting the vibrating transducer system. The three ways described are only given by way of example and are not meant to limit the scope of the invention.

The use of the vibrating transducer power supply is not limited to use in tire condition warning systems. Any system that is subject to vibrations can use this type of power supply. Also, a system can be designed that generates mechanical vibrations in the arm that would, in turn, generate electrical power. Such a system could comprise a mechanical spring or oscillator that would vibrate the arm. This type of system would yield a portable power supply that would be small, compact, reliable and permit versatility for in-the-field uses.

In operation the system of the present invention continuously monitors the condition of the vehicle's pneumatic tires while the vehicle is in motion. As the vehicle wheels are put in motion, vibrations in the wheels are caused by road conditions and natural wheel hop. These vibrations cause the housing fixedly attached to the to the wheel rim to vibrate which, in turn, produces flexing of the weighted transducer assembly. That is, the weighted arm 26 of the vibrating transducer system 24 will vibrate thus causing transducer 32 to flex, thus transforming the mechanical energy caused by the wheel vibrations into electrical energy. It is this electrical energy that provides power for the remainder of the device. Preferably, the electrical energy produced by the vibrating transducer system 24 will be shunted out until an abnormal condition occurs. At such time, the energy produced will pass to the electronic circuit 18 so that it can be processed. A signal will then be transmitted to a monitoring device located within the passenger compartment which is indicative of the abnormal sensed condition.

This invention has been described with reference to preferred embodiments. Obvious modifications and alterations will occur to others upon reading and understanding of this specification. Such modifications include the sensing of tire pressure, tire temperature, etc. The intention is to include all such modifications and alterations insofar as they come within the scope of the appended claims or the equivalent thereof.

Having thus described my invention, I now claim:

1. A device for sensing the abnormal condition of a pneumatic tire preferably of the type used on an automobile wherein said tire is mounted on a tire rim and said tire is subject to normal wheel vibrations, said device comprising:

a housing;

a fastening means for fixedly attaching said housing to said tire rim;

sensing means fixedly attached to said housing for continuously monitoring a condition within the tire and for generating a signal indicative of an abnormal condition;

electronic means located within said housing and operatively connected to said sensing means for electronically processing the signal from said sensing means and for generating a transmission signal;

antenna means located within said housing and operatively connected to said electronic means for transmitting the transmission signal indicative of the tire condition;

power supply means located within said housing and operatively connected to said electronic means, said power supply means further comprising an arm fixedly attached to said housing such that said arm is rendered vibratable when said wheel vibrations occur, weight means fixedly attached to said arm such that said arm will flex when said wheel vibrates, and a transducer means piezoelectrically responsive in the flexure mode and when said arm flexes, thus producing power for said electronic means;

means responsive to said abnormal condition signal for rendering effective the power supply means; and receiving means that receives the transmitted signal and indicates the condition of the tire.

2. The device as defined in claim 1 wherein said transducer means is a double piezoelectric layer wired in series.

3. The device as defined in claim 1 wherein said housing is located within the tire.

4. The device as defined in claim 1 wherein said sensing means senses pressure.

5. The device as defined in claim 1 wherein said sensing means senses temperature.

6. The device as defined in claim 1 wherein said antenna means is molded into the housing.

* * * * *